United States Patent

[11] 3,612,985

| | | |
|---|---|---|
| [72] | Inventor | Arthur F. Rockett<br>Indianapolis, Ind. |
| [21] | Appl. No. | 7,277 |
| [22] | Filed | Jan. 30, 1970 |
| [45] | Patented | Oct. 12, 1971 |
| [73] | Assignee | The United States of America as represented by The Secretary of the Navy |

[54] SWITCH BOUNCE TESTER
4 Claims, 1 Drawing Fig.

[52] U.S. Cl. .................................................... 324/28 R
[51] Int. Cl. ....................................................... G01r 31/02
[50] Field of Search ............................................. 324/28 R, 28 CH, 189, 190, 191

[56] References Cited
UNITED STATES PATENTS

| | | | |
|---|---|---|---|
| 2,236,157 | 3/1941 | Rea .............................. | 324/28 CH |
| 3,364,419 | 1/1968 | Anderson ..................... | 324/28 R |
| 3,393,360 | 7/1968 | Keating ........................ | 324/28 R |

OTHER REFERENCES

Richter et al.; An Instrument for the Determination of Contact Making & Breaking Time; AIEE Tech. Paper 43– 1; Nov. 1942; pp. 1– 4 (copy 324– 28 R)

*Primary Examiner*—Rudolph V. Rolinec
*Assistant Examiner*—R. O. Corcoran
*Attorneys*—R. S. Sciascia and H. H. Losche ABSTRACT: A switch bounce tester to measure the cumulative bounce time having an input signal level comparator, an integrating operational amplifier, and an output voltage limit comparator with a clock-operated discharging switch in parallel with the operational amplifier to discharge same of signals from a tested switch for intervals of time of clock pulses and to sum the signals from the tested switch during intervals between clock pulses to produce voltage proportional to time of the bounce accumulation of the tested switch.

PATENTED OCT 12 1971 3,612,985
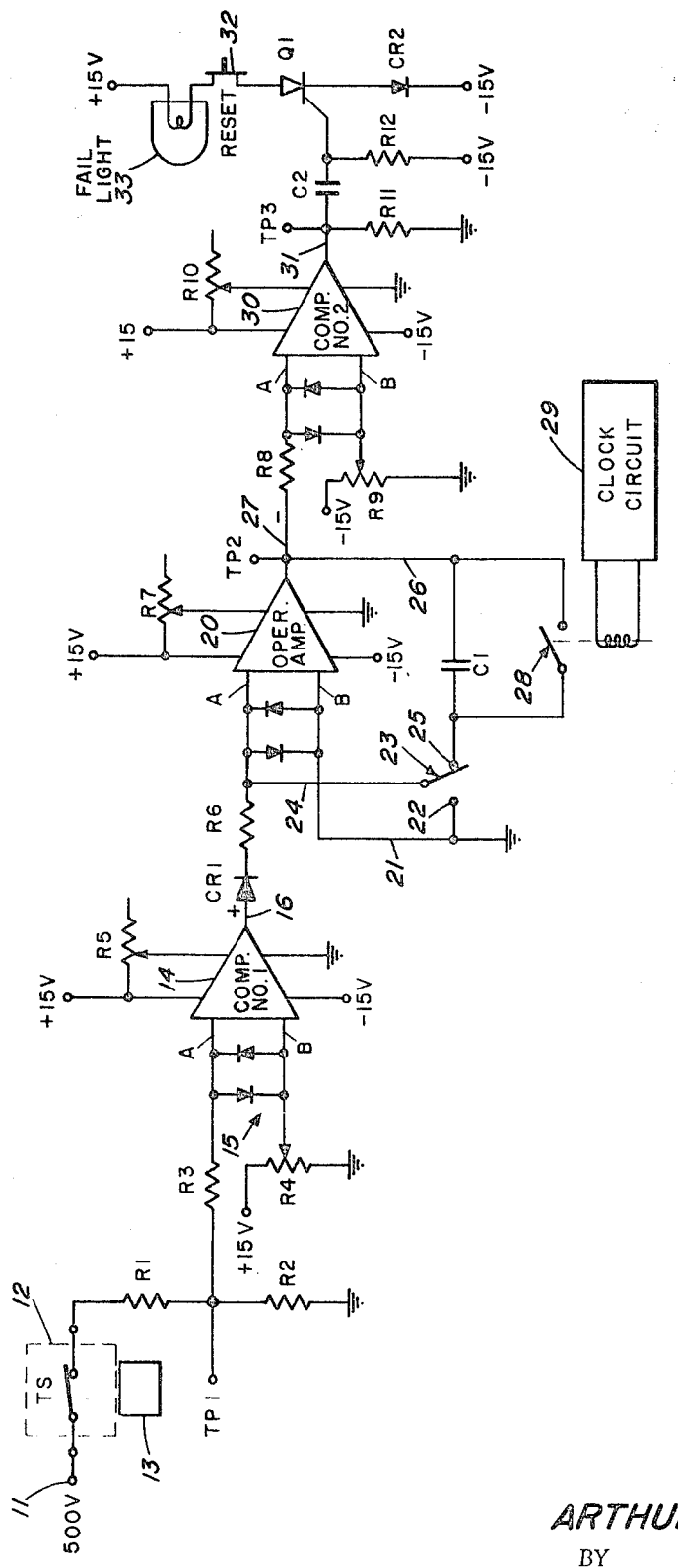
INVENTOR.
*ARTHUR F. ROCKETT*
BY
*H. H. Loscke*
ATTORNEY 3,612,985

SWITCH BOUNCE TESTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to electric switch bounce testers and more particularly to electronic means of indicating switch bounce signals that exceed a predetermined amount in a present interval of time.

In prior known switch bounce tester devices the bounce of the switch was viewed on a storage oscilloscope at random samples of time during vibration testing. This method is slow and only a few samples can be taken during testing because of the time required by the operator to visually measure the time intervals, add the intervals, and record the total bounce time of the switch. During the test the vibration frequency is continually changing over a wide range of frequencies. Therefore it is impossible to certify that the switch remains within limits over the entire frequency range.

SUMMARY OF THE INVENTION

In the present invention the input from a mechanical contact electrical switch to be tested is coupled through a voltage divider to a comparator circuit to compare the switch bounce voltage signals with a preadjusted voltage. Switch bounce signals falling below the threshold of the preadjusted voltage have the time intervals below this voltage summed in an integrating operational amplifier as a voltage equivalent. This voltage equivalent is compared with a second preadjusted voltage in a second comparator, the output of which is differentiated and applied to the gate of a silicon-controlled rectifier having an indicator in its anode circuit. A clock circuit discharges the summed voltage periodically to provide samples of the switch bounce signals for timed intervals to produce indications whenever the accumulated bounce time of the switch contacts exceeds a predetermined amount over a preset time interval. It is therefore a general object of this invention to provide an electric switch bounce tester to indicate excessive switch contact bounce over a preset required standard.

BRIEF DESCRIPTION OF THE DRAWING

These and other objects and the attendant advantages, features and uses will become more apparent to those skilled in the art as a more detailed description proceeds when considered along with the accompanying drawing shown as a single FIGURE in circuit and block schematic of the preferred embodiment of the invention.

DESCRIPTION OF THE PREFERRED EMBODIMENT

Referring more particularly to the FIGURE of drawing a voltage source, such as applied to terminal 11 of a voltage for which a switch 12 under test is designed, and herein shown for the purpose of the example as being 500 volts, is coupled through the switch 12 to a voltage divider circuit consisting of resistors R1 and R2. The switch under test is associated with a means of vibrating the switch, herein illustrated as being a vibrating means 13 to vibrate switch 12 over a wide range of frequency. The junction of the divider circuit R1, R2 reducing the voltage across the switch to about 10 volts is coupled through a current-limiting resistor R3 as input A to a first comparator circuit 14. A second input to the comparator circuit 14 is input B taken from the adjustable tap of a potentiometer R4 having positive voltage, herein illustrated as being +15 volts coupled across the resistance of the potentiometer R4. A pair of oppositely oriented diodes 15 are coupled across the inputs A and B to protect these inputs from overvoltage to the comparator circuit. As long as the input voltage A exceeds the input voltage B, comparator 14 will produce no output at 16, but upon the voltage input B exceeding the input A, a positive voltage output will appear on 16 such as a 5-volt output where the comparator 14 is coupled in a voltage circuit +15 volts to −15 volts, as illustrated herein. A variable resistor R5 is used to reduce the internal input offset voltage of the comparator 01.

The output 16 of the first comparator 14 is coupled through a diode CR1 and a current-limiting resistor R6 as input A to an operational amplifier 20. The diode CR1 is used to compensate for error in the output when the first comparator 14 is at zero volts by blocking current flow until the forward junction voltage of the diode is exceeded. The second input B to the operational amplifier 20 is by way of a conductor 21 in common to a fixed potential such as ground, and also to one terminal 22 of a single-pole double-throw switch 23, the switch blade of which is coupled by way of conductor means 24 to the input A of operational amplifier 20. The second contact 25 of the switch 23 is coupled to one plate of a storage capacitor C1, the opposite plate of which is coupled by way of the conductor means 26 to the output 27 of the operational amplifier 20. A normally open relay switch 28 is coupled in parallel to the storage capacitor C1, the operation of the relay switch being under the control of a clock circuit 29 to energize the relay every 23 milliseconds for 3 milliseconds. The operational amplifier 20 is illustrated as being in a voltage circuit from +15 volts to −15 volts for the purpose of example of operation although other choices of voltages may be used as desired to meet different applications of the device. The variable resistance R7, like the variable resistor R5, is to reduce the internal input offset voltage of the amplifier. Any positive voltage on the output 16 of the first comparator 14 applied to the input terminal A of amplifier 20 is operative to be compared to the voltage on input B, or fixed ground potential. This voltage is integrated by the integrating amplifier combination R6, C1, 20 to produce a feedback of voltage over conductor 26 and C1 to maintain the input A at zero voltage, this integrated voltage on output 27 being the equivalent voltage of the test switch bounce "off" time accumulation for each sample interval. Again for the purpose of example, the clock circuit is used to close the relay switch 28 for 3 milliseconds out of every 23 milliseconds of time thereby allowing 20 millisecond intervals of time for charging samples of the voltage output of comparator 14 in the output 16. If the switch 12 under test breaks contact a sufficient amount of time within the 20 millisecond sampling period of time to cause a build up of voltage at the input A of amplifier 20 to exceed the input B, the operational amplifier 20 will produce a negative output voltage on the output 27 which, when applied to the feedback capacitor C1 connected by the switch 23 to contact 25, will return the input A to zero volts with respect to B, and thus operate as an integration circuit to sum the voltage pulses on the output 16 of comparator 14 which voltage pulses are in direct correspondence to switch noncontact bounce of the switch 12 under test; that is, each bounce of switch 12 breaking contact produces a voltage pulse of 5 volts on output 16 for summation.

The output 27 of the operational amplifier 20 is coupled through a current-limiting resistor R8 as input A to a second comparator circuit 30. The second input B to comparator 30 is from the adjustable contact of potentiometer R9 coupled between a negative voltage source, herein illustrated as being −15 volts and a fixed potential such as ground. A pair of oppositely oriented diodes are coupled in parallel across the inputs A and B in the same manner as in operational amplifier 20 and the first comparator 14, and for the same purpose. The 02 comparator 30 is likewise coupled in a voltage circuit, herein illustrated as +15 and −15, with a variable resistor R10 coupled to the comparator for the same purpose and in the same manner as shown for the first comparator 14 and operational amplifier 20. The output 31 of the second comparator 30 is coupled to a resistor R11 and is also coupled to one plate of a coupling capacitor C2, the opposite plate of which is in common to a resistor R12 and to the gate terminal of a silicon-controlled rectifier Q1. The resistor R12 normally biases Q1 to a nonconductive state. The resistor R11 and the capacitor C2 function as a differentiator circuit for the output 31 of the second comparator. The anode of the silicon-control rectifier Q1 is through a reset switch 32 and an incandescent light 33 in series to one terminal of a voltage source such as a +15-volt source. The cathode of the silicon-controlled rectifier Q1 is through a diode CR2 to the other terminal of the voltage source, herein illustrated to be −15 volts. CR2 is used to increase the noise immunity of Q1 against false triggering. Whenever the voltage at input B from its adjusted position on the potentiometer R9 becomes more positive than the voltage of input A to the second comparator circuit 30, a voltage of, for example 5 volts, on output 31 will be differentiated by R11 and C2 to produce a leading-edge voltage spike on the gate circuit of the silicon-controlled rectifier Q1 placing it into conduction. With the reset switch 32 closed the incandescent light or fail light 33 will glow and will remain so until the reset switch 32 is opened since it is characteristic of silicon-controlled rectifiers as Q1 to remain in conduction once placed into conduction. The fail light 33 indicates that the bounce of the test switch is excessive as will herein become more fully understood in the description of operation. Test points TP1, TP2, and TP3 are used to test the circuit for failure and the current-limiting resistors R3, R6, and R8 as well as the diodes 15 protect the circuit in the event of accidental shorts on the test points.

OPERATION

In the operation of the device as shown in the figure of drawing, the potentiometer R4 is adjusted to a position of voltage output setting a threshold for the voltage input at A determined from the "on" time or "contact" time of the switch 12 under test. Whenever the contact of the switch 12 under test is broken, the voltage input at B in the comparator 14 produces a +5-volt output on 16 to the input A of the operational amplifier 20. The potentiometer R4 is adjustable between zero and +15 volts while the input B of the operational amplifier 20 is fixed at zero voltage. Since switch 12 under test has bouncing contacts, the output 16 will be a random positive pulse-type voltage occurring with each switch 12 contact break which is summed by the integrator amplifier circuit R6,C1,20. The "off" time or "noncontact" time of the test switch 12 will cause integration or summation of the voltage pulses for each 20 millisecond sampling period on the output 27 to be fed back through C1 as a negative voltage at input A of amplifier 20 to maintain this input at zero voltage. Therefore, the output voltage of the integrator R6,C1,20 is directly proportional to the sum of the time increments that the voltage at input A of comparator 14 drops below input B of this comparator. When input A builds up a voltage by integration summation and exceeds input B on the operational amplifier 20, this voltage buildup will be produced inverted on output 27 which is applied through the resistor R8 to the input A of the second comparator 30. The adjustable tap of the potentiometer R9 establishes a threshold voltage for the input A in comparator 30 to establish either a longer or shorter "off" time for the test switch 12 bounce such that if the bounce exceeds a predetermined amount of time in "off" cycles in the 20 millisecond sample period, the voltage accumulation summed by R6,C1 and the operational amplifier 20 in the comparator 02 will produce an output on 31 producing a positive voltage spike which will trigger the gate circuit of the silicon-controlled rectifier Q1 to produce an indication by glow of the fail light 33 to show that the test switch 12 has exceeded the limitation of bounce qualified for the desired use. Adjustment of the potentiometers R4 and R9 establishes this limitation of use for the switch 12 under test. Switch 23 may be switched to contact 22 momentarily to ground or discharge the input A, as desired or considered necessary at the beginning of a test. Any switch 12 under test which does not make the fail light 33 glow shall be considered useful for the purpose designed while switch 12 under test causing the fail light 33 to glow will be rejected for the purpose of use.

While many modifications may be made in the constructional details of the preferred embodiment as by changes of voltages applied for particular applications, it is to be understood that I desire to be limited in the spirit of my invention only by the scope of the appended claims.

1. A mechanical electric switch contact bounce tester circuit comprising:
    means for actuating the switch to be tested so as to generate signals indicative of switch bounce;
    a first comparator circuit having a first input adapted to be coupled to the signals from the switch to be tested and a second input of a first adjustable threshold voltage level, said comparator generating a signal each time the switch bounces;
    an integrating operational amplifier having one input coupled to the output of said first comparator circuit through a resistor and to one plate of a capacitor and a second input coupled to a fixed potential, said capacitor having its other plate coupled to the amplifier output, the output of said amplifier being proportional to the cumulative noncontact bounce time of said switch;
    a second comparator circuit having a first input coupled to the output of said operational amplifier and a second input coupled to a second adjustable threshold voltage, said second comparator generating a signal each time the cumulative output exceeds a certain value;
    a differentiating circuit coupled in the output of said second comparator;
    an electronic switch having a control terminal coupled to the output of said differentiating circuit and an electric indicator in circuit with said electronic switch; and
    a clock circuit coupled to a switch periodically paralleling said integrating operational amplifier to periodically short same and discharging the cumulative output whereby the cumulative noncontact bounce of the switch contacts of a switch under test will activate said indicator whenever the time accumulation of noncontact bounce within the period established by said clock circuit exceeds a predetermined time to produce a voltage summation by said operational amplifier sufficient to exceed said second adjustable threshold voltage level.

2. A mechanical electric switch bounce tester circuit as set forth in claim 1 wherein
    said electronic switch is a silicon-controlled rectifier and said control terminal is the gate terminal.

3. A mechanical electric switch bounce tester circuit as set forth in claim 2 wherein
    said first and second adjustable voltages are each potentiometers having the resistance element thereof coupled across a voltage source and the movable tap thereof coupled as said second inputs.

4. A mechanical electric switch bounce tester circuit as set forth in claim 3 wherein
    said clock circuit coupled to a switch is a clock circuit output coupled to the electromagnetic actuator coil of a fast-acting relay switch, the contacts of which are in a circuit in parallel with said capacitor.